Figure 1:
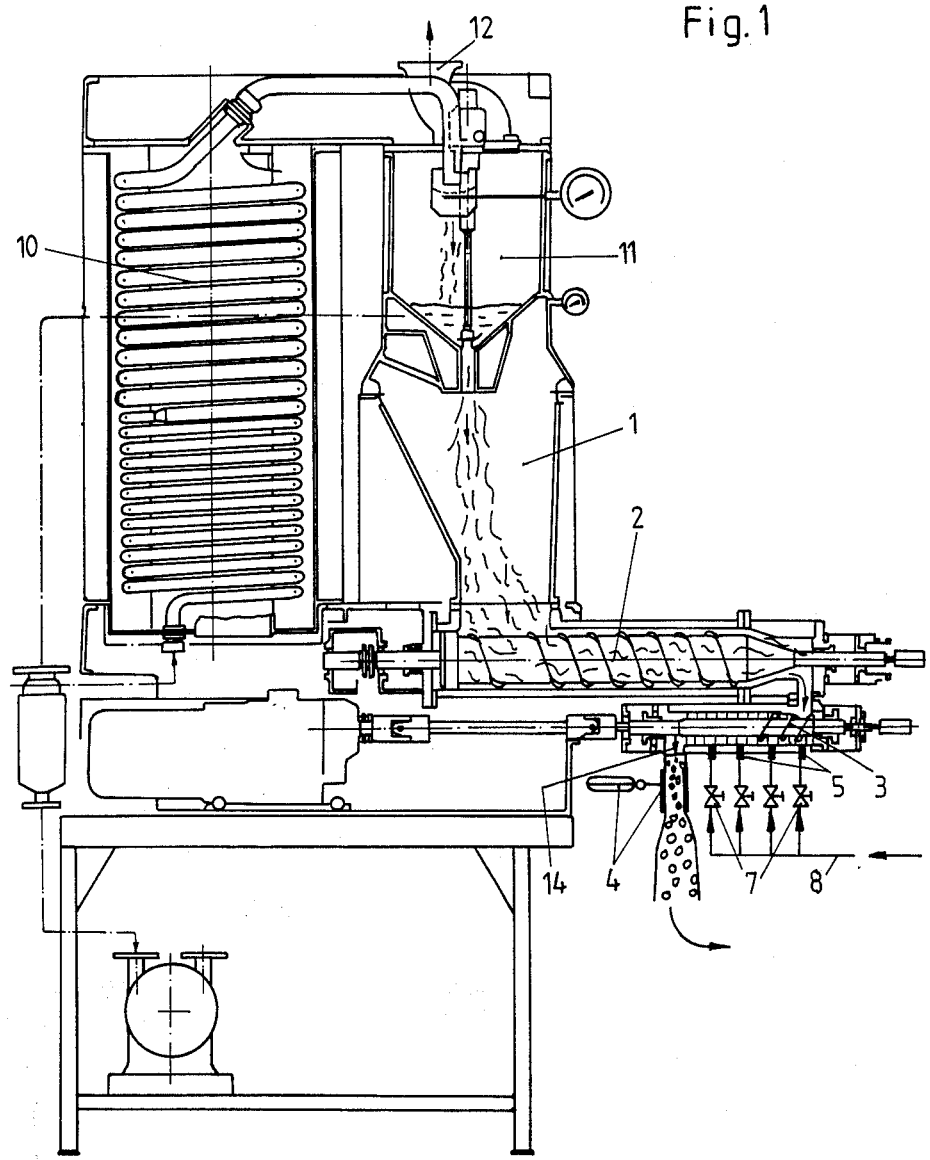

United States Patent [19]

Mergelsberg

[11] Patent Number: 4,666,730

[45] Date of Patent: May 19, 1987

[54] METHOD FOR CONTINUOUSLY PROCESSING BOILED AND VACUUMIZED CONFECTIONERY MASSES

[75] Inventor: Reinhard Mergelsberg, Garbsen, Fed. Rep. of Germany

[73] Assignee: Otto Hänsel GmbH, Hanover, Fed. Rep. of Germany

[21] Appl. No.: 893,449

[22] Filed: Aug. 7, 1986

Related U.S. Application Data

[63] Continuation of Ser. No. 656,869, Oct. 2, 1984, abandoned.

[30] Foreign Application Priority Data

Oct. 5, 1983 [DE]  Fed. Rep. of Germany ....... 3336187

[51] Int. Cl.$^4$ .............................................. A23G 3/02
[52] U.S. Cl. .................................. 426/572; 366/105; 366/107; 426/474; 426/660
[58] Field of Search ............... 426/474, 564, 660, 659, 426/572; 99/348; 366/105, 106, 107

[56] References Cited

U.S. PATENT DOCUMENTS 4,104,412  8/1978  Fischer et al. ...................... 426/660
4,487,118  12/1984  Hansel et al. ........................ 426/660

Primary Examiner—George Yeung
Attorney, Agent, or Firm—Max Fogiel

[57] ABSTRACT

The invention relates to a method for continuously processing boiled and vacuumized confectinery masses, especially bonbon masses like hard and soft caramel masses, fondant masses, etc., in a mixer, which the mass being processed travels through while simultaneously being supplied with compressed air, whereby the inside of the mixer is kept pressurized in accordance with the invention by regulating the mixer outlet.

1 Claim, 2 Drawing Figures

METHOD FOR CONTINUOUSLY PROCESSING BOILED AND VACUUMIZED CONFECTIONERY MASSES

This application is a continuation of application Ser. No. 656,869, filed Oct. 2, 1984, now abandoned.

The invention relates to a method for continuously processing boiled and vacuumized confectionery masses, especially bonbon masses like hard and soft caramel masses, fondant masses, etc., and also discloses a device that carries out the method and employs a boiling setup like that described in DBP No. 1 283 662 for example. Thus, DE-AS No. 2 512 423 describes a device with a mixer that accommodates the mass to be processed and that consists of a housing with mixing tools operating inside it, whereby there is a compressed-air inlet on the housing that allows the sugar mass to be improved in appearance and consistency by working air into it. The drawback of such devices is that the air escapes from the mixer prematurely and the setup accordingly is ineffective. This is also true of the devices in accordance with U.S. Pat. No. 2,197,919, which is, however, intended for processing sugar masses that contain chewing gum and demands that the mass being processed be maintained at a minimum of viscosity by means of a maximum of temperature.

The object of the present invention is to eliminate the drawbacks of the previously known setups for processing sugar masses and to allow continuous working in and homogeneous distribution of a gas, air for example, in continuously manufactured bonbon masses that have a severely decreased density, in order to obtain an especially satisfactory appearance, something called "silkiness," and a calculated alteration in crunch as a result of severely decreased density in the case of stamped-out bonbons for example.

This object is attained in accordance with the invention in that the space inside the mixer, which the mass being processed travels through while simultaneously being supplied with compressed air, is kept pressurized by regulating the mixer outlet. In other words, this means that excess pressure is maintained in the mixer outlet inside the mixer in order to generate the pressure gradients necessary to introduce air into the mass.

The compressed air can be introduced inside the mixer distributed over its total length.

The device for carrying out the method is characterized in that a regulating mechanism like a valve, throttle, or similar mechanism for adjusting the pressure inside the mixer is provided in the mixer outlet. The regulating mechanism in the mixer outlet is in accordance with the invention continuously variable for purposes of adjusting the particular pressure variants required. A certain number, preferably several, of individually variable compressed-air supply lines that can be separately varied and regulated by means of fine-adjustment valves are on the other hand provided in the mixer housing distributed over its length.

Figure 2:
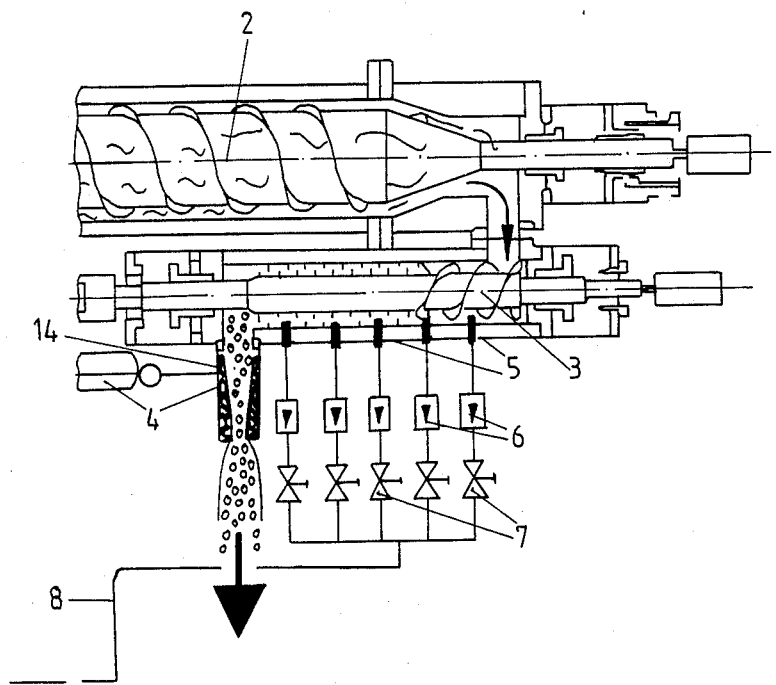

The theory behind the invention, which allows a wide range of potential embodiments, is illustrated in the attached drawings, in which FIG. 1 is a schematic illustration of a boiling and processing setup for sugar masses and FIG. 2 is a magnified detail of FIG. 1 for more satisfactory illustration of the invention.

The sugar mass, after being boiled, arrives through a boiling coil 10, as will be evident from FIG. 1, in condensation space 11, where the vapors are separated from the boiled bonbon mass and removed over a vapor exhaust 12. The boiled bonbon mass is continuously suctioned into a vacuumized space where the prevailing low absolute pressure generates a secondary condensation accompanied by a resulting cooling.

The bonbon mass, with its viscosity increased by the removal of water during secondary condensation and by cooling, is then conveyed by an extraction screw 2 out of the vacuumized area into a downstream mixing screw 3.

Flavorings, essences, and colorants are continuously mixed into the bonbon mass in mixing screw 3, a process that is not illustrated here.

In the continuous manufacture of highly aerated bonbon masses in accordance with the invention, the necessary gas, compressed air for example, is blown inside the housing of mixing screw through a line 8 and through several, five for example, nozzles 5. The volume of gas, of air for example, blown into the bonbon mass inside the mixer through the separate nozzles 5 can be separately adjusted with respect to each nozzle 5 by means of a fine-adjustment valve 7, with the values of the volumes of gas, air for example, that correspond to each adjustment, being readable from flowmeters 6.

Decisive for the degree of aeration of a bonbon mass in continuous flow through mixing screw 3 are the rate at which the gas, air for example, is injected into the bonbon mass through the nozzles and the pressure gradient as the mass passed through the continuously regulated mixer-outlet valve 4 that constitutes the mixer outlet.

The pressure inside the mixer screw that is needed to maintain the pressure gradients adjusted with mixer-outlet valve 4 is applied with respect to the bonbon mass to be aerated by extraction screw 2 and with respect to the gas, air for example, by sufficiently high network pressure.

When the system in accordance with the invention is converted for a product that does not have air, gas for instance, worked into it, it is only necessary to interrupt the supply of air inside the mixer by closing fine-adjustment valves 7.

I claim:

1. A method for continuously processing a boiled and vacuumized confectionery mass selected from the group consisting of hard caramel mass, soft caramel mass and fondant mass comprising the steps of: passing the confectionery mass to be processed through a mixer along a predetermined path within the interior of said mixer; supplying compressed air to said mass while passing through said mixer; regulating a mixer outlet for maintaining the interior of the mixer presurized; said compressed air being introduced into the interior of said mixer at a plurality of locations distributed over the length of said mixer for maintaining a predetermined pressure gradient within the interior of the mixer along said predetermined path taken by said mass during processing through said mixer; whereby said mixer outlet is regulated dependent on pressure within the mixer; said pressure gradient being produced by different pressures at said locations.

* * * * *